United States Patent
Johnston (10) Patent No.: US 10,040,387 B2
(45) Date of Patent: Aug. 7, 2018

(54) TRUCK BED COT

(71) Applicant: Miller O. Johnston, North Little Rock, AR (US)

(72) Inventor: Miller O. Johnston, North Little Rock, AR (US)

(*) Notice: Subject to any disclaimer, the term of this patent is extended or adjusted under 35 U.S.C. 154(b) by 183 days.

(21) Appl. No.: 14/937,491

(22) Filed: Nov. 10, 2015

(65) Prior Publication Data

US 2016/0129827 A1     May 12, 2016

Related U.S. Application Data

(60) Provisional application No. 62/077,738, filed on Nov. 10, 2014.

(51) Int. Cl.
| | |
|---|---|
| *B60P 3/39* | (2006.01) |
| *A47C 17/80* | (2006.01) |
| *A47C 21/04* | (2006.01) |

(52) U.S. Cl.
CPC .............. *B60P 3/39* (2013.01); *A47C 17/80* (2013.01); *A47C 21/048* (2013.01)

(58) Field of Classification Search
CPC ....... A47C 21/048; A47C 21/04; A47C 17/64; A47C 17/645; A47C 17/70; A47C 17/705; A47C 17/76; A47C 17/80; A47C 17/82; A47C 17/86; B60P 3/39
See application file for complete search history.

(56) References Cited

U.S. PATENT DOCUMENTS

| | | | | | |
|---|---|---|---|---|---|
| 1,177,390 | A | * | 3/1916 | Daniel .................... | A47C 17/86 5/308 |
| 1,308,139 | A | * | 7/1919 | Zagelmeyer ........... | A47C 17/80 190/12 R |
| 1,503,391 | A | * | 7/1924 | Teske ..................... | A47C 17/80 5/117 |
| 1,519,048 | A | * | 12/1924 | Powell ................... | A47C 17/80 5/114 |
| 1,527,016 | A | * | 2/1925 | Senior .................... | A47C 17/80 5/119 |

(Continued)

OTHER PUBLICATIONS

Contiguous. (n.d.) Random House Kernerman Webster's College Dictionary. (2010). Retrieved Aug. 3, 2017 from http://www.thefreedictionary.com/contiguous.*

*Primary Examiner* — Nicholas F Polito
*Assistant Examiner* — Amanda L Bailey
(74) *Attorney, Agent, or Firm* — Charles McCloskey (57) ABSTRACT

A truck bed cot has a generally rectangular platform, three legs upon one sidewall, two clamps upon an opposite sidewall, two endwalls, a plurality of slats between the sidewalls, two brackets for connection to a supporting surface, a heated sleeping pad, and a solar panel. The platform has a fore platform and an aft platform that receive the legs when the platform folds. The platform has an unfolded position with the fore platform coplanar with the aft platform. The platform, through its brackets and legs, adjusts its elevation relative to a supporting surface. The sleeping pad includes a control and battery in communication with the solar panel. The battery also provides ports for connection to various cables. A drawer provides storage and a flat surface for a user and a strap allows a user to carry the folded invention.

10 Claims, 5 Drawing Sheets

(56) References Cited

U.S. PATENT DOCUMENTS

| | | | | | |
|---|---|---|---|---|---|
| 1,535,506 | A | * | 4/1925 | Taggart | A47C 17/80 296/9 |
| 1,549,287 | A | * | 8/1925 | Bolander | A47C 17/80 5/119 |
| 1,587,774 | A | * | 6/1926 | Harris | A47C 17/80 5/119 |
| 1,668,221 | A | * | 5/1928 | Speegle | A47C 17/80 5/119 |
| 1,702,170 | A | * | 2/1929 | Pieri, Sr. | A47C 17/80 108/100 |
| 1,759,977 | A | * | 5/1930 | Denton | A47C 17/80 5/119 |
| 1,763,447 | A | * | 6/1930 | Schilling | A47C 17/80 5/112 |
| 1,830,378 | A | * | 11/1931 | Van Wert | A47C 17/80 5/112 |
| 1,906,828 | A | * | 5/1933 | Wilson | A47C 17/80 5/111 |
| 2,378,448 | A | * | 6/1945 | Thompson | A47C 17/80 5/119 |
| 4,242,766 | A | * | 1/1981 | Allegro | A47C 21/044 5/284 |
| 4,993,088 | A | * | 2/1991 | Chudik | B60R 5/04 108/44 |
| 5,386,601 | A | * | 2/1995 | Kohl | A47C 17/70 5/111 |
| 5,566,412 | A | * | 10/1996 | Arnold | A47C 19/045 5/509.1 |
| 5,701,653 | A | * | 12/1997 | Rupe | A47C 19/021 29/432 |
| 5,894,614 | A | * | 4/1999 | Stroud | A47B 91/028 5/200.1 |
| 6,163,900 | A | * | 12/2000 | Stevenson | A47C 17/80 5/118 |
| 8,388,056 | B2 | * | 3/2013 | Smith | A47C 4/286 297/16.2 |
| 2005/0242635 | A1 | * | 11/2005 | Cassaday | A47C 1/022 297/217.3 |
| 2007/0277312 | A1 | * | 12/2007 | Garrigues | A47C 21/048 5/420 |
| 2007/0289060 | A1 | * | 12/2007 | Berkey | A47C 21/046 5/99.1 |
| 2011/0297659 | A1 | * | 12/2011 | Bixler | F24H 3/081 219/201 |
| 2015/0040315 | A1 | * | 2/2015 | Gersin | A47C 21/006 5/417 |
| 2016/0262543 | A1 | * | 9/2016 | Currie | A47C 7/748 |

* cited by examiner

TRUCK BED COT

CROSS-REFERENCE TO RELATED APPLICATION

This non-provisional application claims priority to provisional application No. 62/077,738 filed on Nov. 10, 2014, all of which are owned by the same inventor.

BACKGROUND OF THE INVENTION

The present invention relates generally to aftermarket automotive accessories and more particularly to a sleeping cot installed into a pickup truck bed.

Nature has called people to sleep for millennia. In the beginning, people slept where they could. As civilization took hold, people developed structures and slept under roofs. Under the roofs, people develop beds. When outside of a roof, people harkened back to olden days but used recent technology when camping. People brought the better features of indoor living with them when outside of a roof. In the beginning, people walked between places. As technology grew, people developed many kinds of vehicles. The vehicles kept getting faster and going farther.

On longer trips, and even some short one, people slept on vehicles. People generally slept where they sat, such as in a stage coach or eventually in boats, in trains, in cars, and in aircraft. People also developed vehicles that took home with them, recreational vehicles, or RVs. Such RVs have plenty of shapes and sizes. Larger RVs effectively become a self propelled house. Prime movers, such as trucks, pickup trucks, and some sedans also tow moderately sized RV trailers. Smaller RV appeared as boxes that fit into trucks or other prime movers. The smallest of RV have the form of a cap placed upon the back of a truck as a sort of roof. Such trucks typically have a cargo carrying portion called a bed and the cap serves as a roof for the truck's bed.

DESCRIPTION OF THE PRIOR ART

For camping and temporary living arrangements, people have used cots. The cots generally have a tubular frame, a taught fabric sheet or taut straps between the frame, and legs depending from the frame. The legs may have separate construction or come from bent tubular portions forming a foot that extends beneath the width of a cot. Cots typically have legs on both sides for support from a somewhat level surface such as the earth or floor, as in a gymnasium. Upon a cot, people may place a sleeping bag directly if the cot has a taught fabric sheet or straps. The cot and its components attain the temperature of the surrounding environment and become cold during winter.

Without a cot, people may unroll a pad upon a ground cloth and then place a sleeping bag upon that pad. The pad generally has a foam construction with a sealed outer covering. The pad provides some insulation from ground temperature but attains the temperature of the surrounding air in time.

Instead of a pad, people may use an air mattress. The air mattress inflated by manual blowing or a pump and provides a contained air cushion upon which a person places sleeping bag. The air mattress tends to squish and move as a person moves upon it. The air mattress attains the temperature of the surrounding air while providing some insulation from ground temperatures.

The cots, pads, and air mattresses described generally lay upon a supporting surface. The entire width of the pads and air mattresses and legs of cots contacts the supporting surface, typically upon the same plane. A cot, pad, and air mattress typically stand by themselves without connection to an adjacent upright object or surface.

SUMMARY OF THE INVENTION

The present invention has three folding legs, a sleeping platform, storage below the platform, and a resting plank to mount the cot upright or upon the side of a camper. The present invention, a form of sleeping cot, installs in a truck bed to provide a good night's rest for a user. The resting plank sits upon the side of a pickup truck, or camper, to provide stability and equilibrium for the camper and the cot of the invention. The invention has a sleeping platform along with a solar powered heading sleeping pad that ensures a good night's sleep for a user with heat upon a cold night and the added cushioning of a sleeping pad. The invention has an attachment device, such as a C shaped clamp, that secures the cot of the invention into place upon a truck bed so that the invention provides a stable sleeping area. The two folding legs also provide stability for the cot when deployed in a truck bed. The invention also has storage compartments and a slide out drawer with a cover suitable for use as a table.

Some travelers seek to sleep in the bed of a pickup truck. Sleeping in the back of a truck becomes a nuisance when camping or travelling. The present invention solves the delicate issue of sleeping when camping or travelling in a truck, a pickup truck. The present invention allows a user a good night's sleep while creating room and storage in the limited space of a truck bed. Typically, the bed of a truck is housed by a cap or a camper.

The present invention seeks to provide a solution when camping or sleeping in the bed of a pickup truck. Sleeping in the back of a pick up truck can be very convenient when travelling or camping. But the bed of a truck provides a tough surface to sleep upon which reduces the number of hours of sleep and compromises a good night's rest. Sleeping on the bottom of the truck bed greatly reduces the amount of spaced needed when travelling in a truck, when space is greatly appreciated. This invention provides solid sleeping area that allows a user to sleep comfortably while storing items underneath a bedding platform. Further, the present invention allows the user to sleep comfortably because of the heated sleeping pad. The heated pad provides warmth to a sleeping pad while the sleeping pad provides cushioning for a better nights sleep upon the frame of the invention.

There has thus been outlined, rather broadly, the more important features of the invention in order that the detailed description thereof that follows may be better understood and that the present contribution to the art may be better appreciated. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a truck bed cot that connects to a rail of the side of the bed of a truck, typically along a wall.

Another object is to provide such a truck bed cot that folds compactly.

Another object is to provide such a truck bed cot that adjusts its elevation relative to the bed of the truck for more or less headroom.

Another object is to provide such a truck bed cot that provides a heated sleeping pad.

Another object is to provide such a truck bed cot that utilizes solar energy for charging its heated sleeping pad.

Another object is to provide such a truck bed cot that has connections and ports for other electrical power sources for its heated sleeping pad.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings.

The same reference numerals refer to the same parts throughout the various figures.

DESCRIPTION OF THE PREFERRED EMBODIMENT

The present invention overcomes the prior art limitations by providing a truck bed cot for sleeping in a truck bed beneath a camper top.

Figures 1, 2:
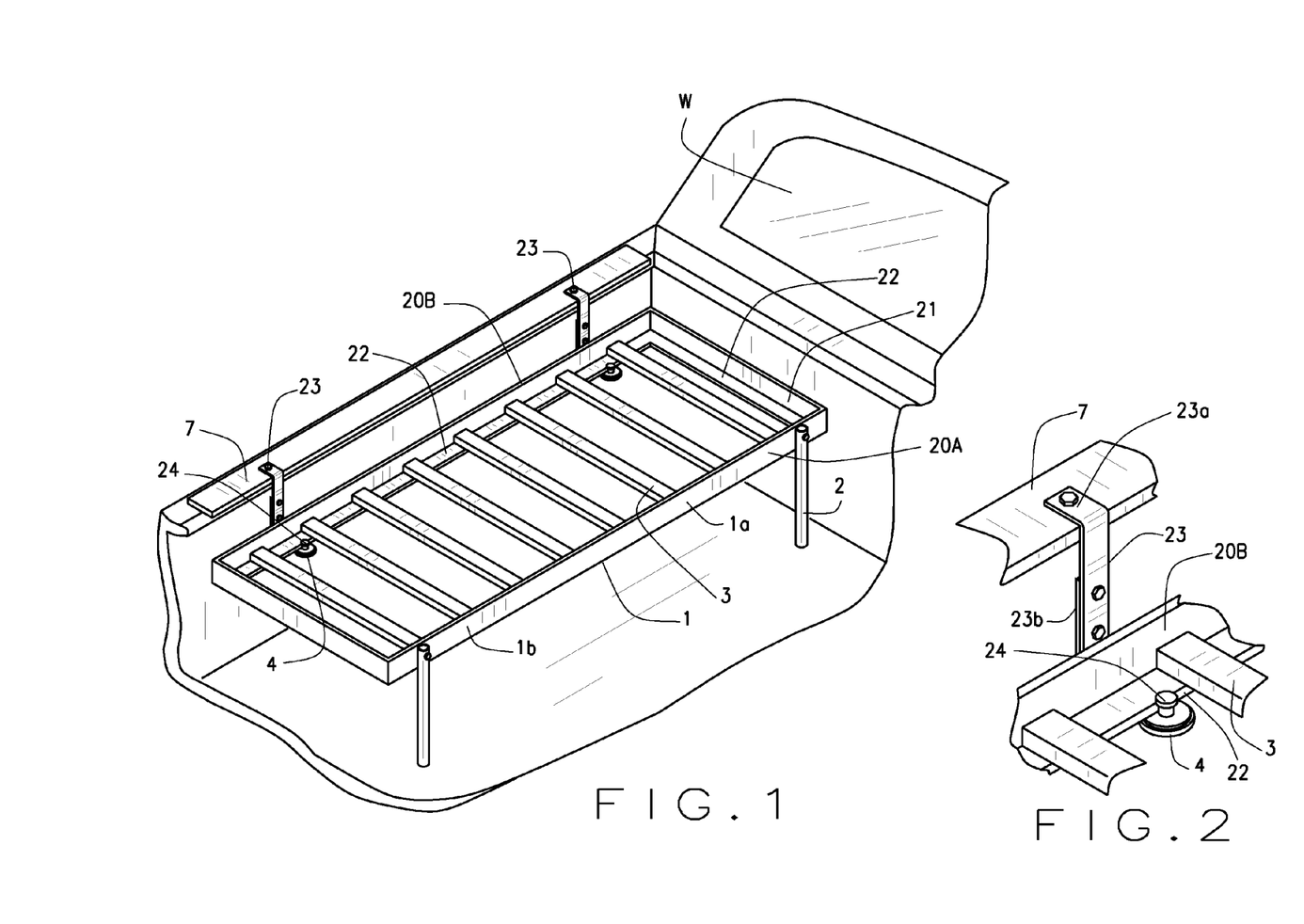
FIG. 1 shows a perspective view of the present invention when installed, this overall view shows the original setting of the invention.
FIG. 2 shows a detailed view of a locking mechanism that secures the sleeping platform to the resting plank.

FIG. 1 shows the bedding platform 1 in its original setting. A folding leg 2 allows the device to be stored in a small area and compact space as well as providing balance and equilibrium to the cot. The aluminum rods 3, or slats, provide support for the sleeping camper, or user. The invention of a bedding platform installs into a bed B of a pickup truck, or truck, typically with a camper top above the bed. The truck has two rails along the side of the bed and the camper top rests upon those rails, not shown. The camper and the rails adjoin the window or the cab, as at W, of the truck.

The present invention has its platform 1 of a generally flat, elongated rectangular shape formed from two mutually parallel and spaced apart sidewalls 20 and two mutually parallel and spaced apart endwalls 21. The endwalls have a perpendicular orientation to the sidewalls and a lesser length than the sidewalls. The sidewalls and the endwalls have a generally L shaped cross section with an upright web and a flange, or lip 22, generally parallel to a plane defined by the platform 1, or alternatively a C shaped cross section. The invention has a plurality of rods, or slats 3, placed within the sidewalls and generally parallel to the endwalls. The slats have a preferred square cross section and join to the lips of each sidewall. The slats are mutually parallel and have spacing comfortable upon which for a user to sleep. Mentioning a user sleeping, the platform has a suitable width and length for a sleeping adult person. The platform has a fore platform 1a generally proximate the head of a user, that is, towards the cab W of the truck, and an aft portion 1b rearward from the cab W. As later shown and described, the fore platform and the aft platform have a hinged portion connecting them and allowing for rotation of the fore platform adjacent to the aft platform for folding of the invention into a folded position as later shown in FIG. 9. In this figure, the fore platform and the aft platform appear coplanar and the platform has an unfolded position, sometimes called open position. The lip 22, or flange, of the sidewalls appears generally parallel to the plane of the platform when in its unfolded position so that during use the lip is beneath the sleeping pad and the plurality of slats.

Upon one sidewall, 20a or the first sidewall, the platform has a leg 2 at the corner of an endwall 21 and the first sidewall 20a. This corner extends inwardly to the bed B of the truck. The leg has a pivotal connection to the corner so that the leg attains an upright orientation as shown upon installation of the platform and a folded orientation within the platform upon collapse of the platform for stowage or movement. The collapsed form of the platform appears later in FIG. 9.

Opposite the leg and first sidewall 20a, the platform has its other sidewall, 20b, or second sidewall, generally located proximate a rail of the bed B of the truck. This sidewall, the second sidewall 20b, has at least two brackets 23 spaced upon it, generally positioned proximate the endwalls. The brackets have a modified C like shape as later shown in the figures. The brackets rest upon a resting plank 7 placed upon the top surface of a rail of the bed B. The plank has a length similar to that of the platform's length, and a rectangular cross section of thin thickness, and width much less than the plank's length. The plank provides a buffer between the brackets and the rails themselves to prevent scratching of the rails. In an alternate embodiment, the invention provides a block for each bracket. Each block has a length at least twice as wide as a bracket though of much less length than the length of the platform. Each bracket has the C like shape with two mutually parallel and spaced apart flanges in the same direction upon a common web. The flanges face outwardly from the platform so that the upper flange rests upon the plank 7 and the lower flange abuts the wall of the bed B. Each bracket has a mount 4 extending opposite the lower flange and into the platform. The mount has a pin 24 upon it that fits into an aperture machined into the lip 22 of the second sidewall 20b. Though a plank and blocks appear in the description above, the Applicant foresees the invention may also operate without a plank or the blocks.

In FIG. 2, the bedding platform 1 appears and attaches to the resting plank 7 as later discussed in FIG. 4. Having mentioned the brackets 23 in FIG. 1, FIG. 2 shows a bracket 23 in more detail. The bracket has its upper flange 23*a* extending outwardly upon the plank 7. Depending from the upper flange, the bracket has its web 23*b* here shown with a plurality of holes. The holes allow for adjusting the height of the bracket as later shown in FIG. 5. The web descends past the web of the second sidewall 20*b* and extends its mount 4 inwardly, that is, out of the plane of the figure. The mount has a generally rounded end and the pin 24 extending perpendicular to the mount, that is, generally parallel to the web 23*b*. The pin fits within an aperture in the lip 22 of the second sidewall 20*b*.

Figure 3:
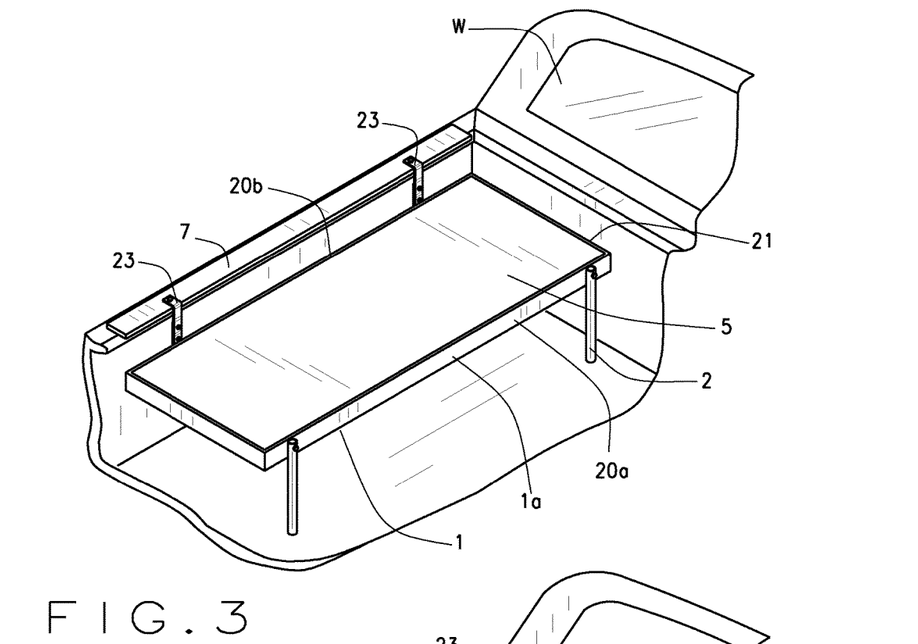
FIG. 3 shows a perspective view of the bedding platform with the heated sleeping pad upon it.

FIG. 3 then shows the bedding platform 1 with a heated sleeping pad 5 upon it providing a soft cushion for the user for a better night's sleep. The heating pad operates upon electrical power provided from the truck, a separate battery, a solar panel, and the like. A user opens the camper top to get sleep and sees the invention as shown in FIG. 3. The invention has its platform 1 deployed flat with the fore portion 1*b* towards the cab W. The platform has one of its endwalls 21 joining to the first sidewall 20*a* forming a corner shown in this figure. Each endwall has a cross sectional shape compatible with the sidewalls. The endwalls join to the sidewalls in a secure manner such as by welding, bolting, or other mechanical fasteners. In an alternate embodiment, the fore platform, the aft platform, and their sidewalls, endwalls, and slats are formed so the fore platform and the aft platform are single pieces. Beneath the corner, a leg 2 descends to the bed B of the truck. Opposite the leg, the platform has its second sidewall 20*b* that joins to the endwall 21 forming another corner. Proximate the other corner, the platform 1 has a bracket 23 extending slightly upwardly from the endwall and resting its own flange 23*a* upon the plank 7. The brackets cooperate with the platform and the legs to provide a level orientation of the platform for sleeping and a slight decrease of elevation of the platform below that of the rails. The lowered elevation of the platform promotes sleep, provides headroom beneath the camper top, and assists in retaining a user upon the invention during sleep. The brackets and the legs each allow a user to adjust their lengths for more or less headroom between the user and any overhead camper top or other roof like structure on the bed of the truck. As shown, the sleeping pad 5 extends upon the entire platform from endwall 21 to endwall 21 and from first sidewall 20*a* to second sidewall 20*b*. The sleeping pad has a generally cushioned construction for comfort and temperature control for the user. The sleeping pad also prevents items from falling into the platform, through the slats, and into the bed. The sleeping pad includes a durable, water resistant covering.

Figure 4:
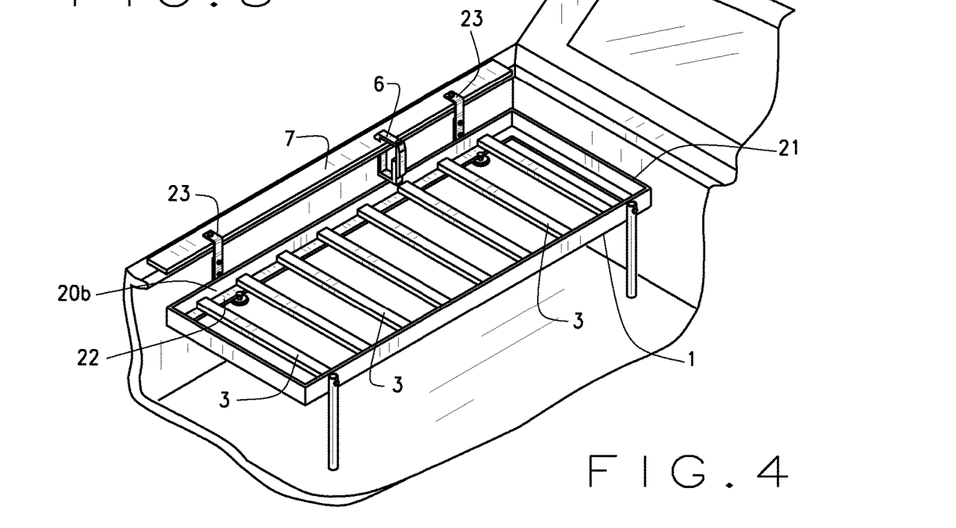
FIG. 4 provides a perspective view of clamping mechanisms that secure the resting plank to the wall of a camper thus fixing it in position.

FIG. 4 then displays the sleeping platform 1 attached to a resting plank 7 where the resting plank provides equilibrium and connects the sleeping platform 1 to the rail of a bed B of a pickup truck, or camper. The present invention remains in position to provide a stable sleeping position by a C shaped clamp as at 6, spring clamp, and the like. More particularly, FIG. 4 shows a perspective view of the platform 1 with an endwall 21 in the background towards the cab W of a truck. The endwall joins to the second sidewall 20*b* with lip 22 of the second sidewall oriented inwardly. The lip receives a plurality of slats 3 placed upon it and joined to the sidewall. As mentioned previously, the slats have a generally square cross section. The slats have that cross section to support the sleeping pad, providing bending resistance when a person sleeps upon the pad, and provides racking resistance so the platform retains its rectangular shape. The second sidewall has two brackets 23 shown attached to it. These brackets then rest upon the plank 7 as previously described. The plank sits upon a rail of a bed B of a truck. To prevent the plank from moving, during sleeping by a user, or motion by the truck, the invention has a C shaped clamp 6 as shown, or other clamp suitable for gripping the plank 7 and fitting around a portion of the cross section of a rail. Keeping the plank in position, prevents the plank, brackets, and platform from shifting in the bed and scratching adjacent parts of the bed B.

Figure 5:
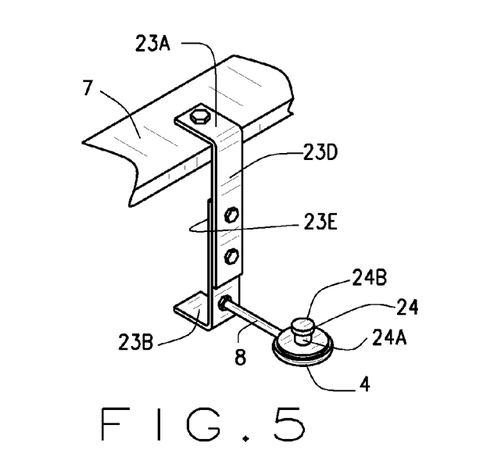
FIG. 5 describes a side view of a locking mechanism having a resting rod that maintains equilibrium and balance for the invention during its usage.

FIG. 5 then provides a resting rod 8 that provides balanced backing for the resting plank 7. The resting rod may have the shape of an eyebolt. More particularly, FIG. 5 shows a bracket's connection to the plank 7. The bracket 23 has its generally C like shape, here shown reversed, with two spaced apart flanges, the upper flange 23*a* and the opposite lower flanges 23*c*. The upper flange and the lower flange are mutually parallel and spaced apart, and extend in the same direction. In an alternate embodiment, the upper flange and the lower flange include a polymer layer or cushion of lesser hardness than steel inwardly to abut the rail of the bed of a truck. The polymer layer or cushion prevents the upper flange and the lower flange from abrading the rail.

The bracket 23 has its web 23*b* spanning between the upper flange and the lower flange, keeping both flanges in their spaced apart orientation. The web has two sections, an upper section 23*d* and a lower section 23*e*, that overlap. The relative position of the two sections adjusts by sliding them and then securing them using a bolt, as previously shown in FIG. 2. The sections have a pattern of holes in them that permits a user to adjust the height of the platform beneath a rail of a bed B of a truck.

As initially discussed in FIG. 2, the web 23*b* of a bracket descends below the plank 7 with its upper section 23*d* that then overlaps with the lower section 23*e*. The upper section extends over the plank while the lower section extends the lower flange 23*b* beneath a rail of the truck. Opposite the lower flange and collinear with it, the lower section has the mount 4 extending inwardly towards the platform, not shown, that is, to the right of this figure. The mount has a generally rounded end, similar to a filled eyelet, and the pin 24 extends perpendicular to the mount and generally parallel to the lower section 23*e* and the web 23*b*. The pin has an elongated stem and then a slightly wider head 24*b*. The head fits within an aperture in the lip 22 of the second sidewall 20*b*. The pin into aperture connection allows for slight movement of the platform during usage so that it maintains equilibrium. Preferably, the second sidewall rests upon the mount and the mount connects at least beneath the second sidewall.

Figure 5A:
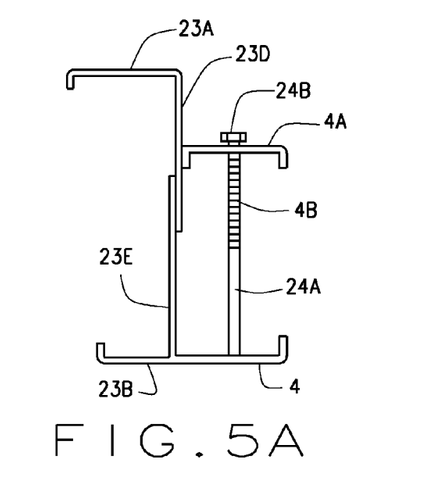
FIG. 5A describes a side view of an alternate embodiment of the locking mechanism.

FIG. 5A then provides an alternate form of the bracket 23 generally used upon the second sidewall. This bracket 23 also has a generally C like shape, here shown reversed, with two spaced apart flanges, the upper flange 23*a* and the opposite lower flange 23*c*. The upper flange and the lower flange are mutually parallel and spaced apart, extend in the same direction, and have a generally L like shape. The bracket 23 has its web 23*b* spanning between the upper flange and the lower flange, keeping both flanges spaced apart as before. The upper flange has a downward extension, similar to a web as at 23*d*. Outwardly from this extension and along the upper flange, the upper flange has an aperture that admits a threaded rod, not shown, axially and generally parallel to the extension. This extension has a length more than that of the upper flange and over half of the desired maximum height of the bracket. The lower flange also has its upward extension, similar to a web as at 23e. This extension has its length more than that of the lower flange and a height nearly half of the desired maximum height of the bracket. This extension has a threaded chamber axially that receives the threaded rod operatively connected to the upper flange. Typically, the extension 23d from the upper flange overlaps outwardly the extension 23e from the lower flange. Turning of the threaded rod allows a user to adjust the height of the bracket and to lower the lower flange and increase headroom between the sleeping pad and any camper top installed upon the bed B of a truck.

As discussed related to FIGS. 2, 5 the web 23c of this alternate embodiment has its lower extension 23e that joins to the lower flange 23b for engagement beneath a rail of the truck. Opposite the lower flange and collinear with it, the lower section has its mount 4 extending inwardly towards the platform, not shown, that is, to the right of this figure. This embodiment of the mount has a generally planar strap like form extending collinear with the lower flange 23b. The mount has an interior lip upwardly and generally spaced inwardly from the extension 23e. The spacing of the mount receives the lip 22 of the second sidewall 20b. Above the mount, this bracket embodiment has a second mount 4a of an inverted U shape. The second mount has similar length as the mount 4. The second mount and the mount cooperate to grasp the second sidewall when placed between them. A pin 24 extends perpendicular to the mount and generally parallel to the lower extension 23e and the upper extension 23d. The pin has an elongated stem 24a and then a slightly wider head 24b. The head fits within an aperture in the second mount 4a and guides the second mount to register with the mount, particularly with the upturned lip. The pin includes a biasing member or spring that urges the second mount to remain towards the mount, that is, to grasp the second sidewall, on its bottom and its top, firmly when placed therein.

Figures 6, 7:
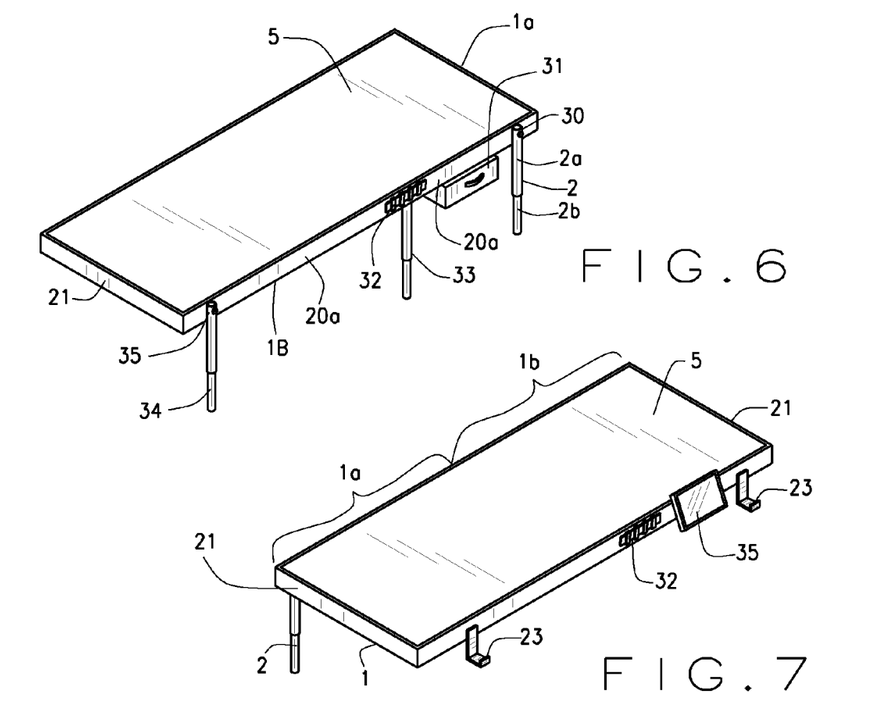
FIG. 6 is a perspective view of the present invention.
FIG. 7 is a perspective view of the present invention.

Turning to FIG. 6, the present invention appears in a perspective view seen by a user who has entered a bed B of a truck, typically beneath a camper top. The invention has its platform 1 with a fore platform 1a here shown to the right and an aft platform shown to the left. The fore platform and the aft platform define a common plane. The sleeping pad fits upon the fore platform and the aft platform. The fore platform and the aft platform share in common the first sidewall 20a. The first sidewall extends from the cab W of a truck rearward to an endwall 21 here shown in the left of the figure. The first sidewall has the leg 2 descending from a pivot 30 at the corner with an endwall proximate the cab W when installed shown. The pivot permits the leg to rotated approximately ninety degrees inwardly, that is, towards the aft portion. The leg 2 has two telescoping portions with a releasable connection that allows a user to adjust the height of the leg in cooperation with the height of the brackets. The adjustment of leg height cooperates with adjusting the bracket height for more or less headroom as desired by the user. Headroom appears as the spacing between the platform and a camper top or other roof like structure placed upon the bed of a truck. Inwardly from the pivot 30, the fore platform has a drawer 31 beneath the sidewall 20a. The drawer has a box like construction with a front having a handle here shown. The drawer has a front, two sides, a bottom, and a back opposite the front. The drawer extends from beneath the platform upon tracks mounted beneath slats 3, not shown. The drawer extends outwardly from the first sidewall 20a when pulled by a user. The drawer includes a lid upon its own top, that is, opposite the bottom and closing the interior space between the front, the two sides, and the back. The lid has a position beneath the platform, the covers the drawer, and serves as a table, night stand, and the like for a user. A user may lift the lid to access the interior of the drawer. In an alternate embodiment the lid has a hinged connected to the drawer opposite the handle shown in this figure.

Inwardly from the drawer 31, the fore platform 1a has a hinged connection 32 to the aft platform 1b. The hinged connection 32 divides the first sidewall 20a here shown and a counterpart hinged connection appears on the second sidewall as later shown. The hinged connection 32 generally separates the fore platform and the aft platform into equal lengths. The hinged connection allows the fore platform to rotate up to one hundred ninety five degrees to fold upon the aft platform. The hinged connection has an axis of rotation generally parallel to the plurality of slats and located proximate the lip. This position of the hinged connection allows the sidewalls to open upwardly for changing the platform from its unfolded to folded positions and more importantly, the sidewalls close the hinged connection downwardly and mutually abut under the weight of a sleeping user. Beneath the hinged connection 32, the aft platform has a second leg 33. The second leg has similar construction to the leg 2 of the fore platform and similar means to adjust its height. As before a user, adjusts the height of the second leg in cooperation with the leg and the brackets so the platform stays level and fits within a bed B of a truck.

Further away from the hinged connection, the first sidewall 20a joins to the endwall 21 here shown and forms another corner for the platform. At this corner, the aft platform has a third leg 34 descending from a pivot 35 at the corner. The third leg also has similar construction and height adjustment as the second leg 33, and the leg 2, so that a user adjusts the height of the third leg in cooperation with the other two legs and the brackets for a level platform. Similar to the leg 2, the third leg 34 rotates inwardly to the aft platform, that is, towards a cab W of a truck, about ninety degrees. The aft platform also has the second leg 33 rotating inwardly to the aft platform, that is, away from the cab W. Both the second leg 33 and the third leg 34 rotate towards each other and then nest near the first sidewall 20a of the aft portion. The second leg 33 and the third leg 34 also have two telescoping sections like the first leg that allow for axial adjustment of the height of the legs. The folding of the legs, 2, 33, 34, prepares the platform for folding, stowage, and transport as needed. The legs, 2, 33, 34, generally depend from the first sidewall 20a and have a folded position within the platform and the drawer 31 does not interfere with the leg 2 and second leg 33 when folded, particular shown in FIG. 9 and an unfolded position perpendicular and beneath the platform as shown in FIGS. 1, 3, 6, 7, 10.

Opposite the view in FIG. 6, FIG. 7 shows the platform 1 with an endwall 21 towards the left of this figure, that is, towards the cab W of a truck. The platform has its endwall with the leg 2 descending beneath the platform as previously described. The endwall joins to the second sidewall opposite the leg 2 at a corner towards the foreground of this figure. The second sidewall 20b extends to the right in this figure as it defines the fore platform 1a of the platform. The second sidewall then has a hinged connection 32 generally dividing the fore platform equally from the aft platform. As previously described, the hinged connection allows the aft platform to fold upon the fore platform into a compact form for stowage and moving as needed. Opposite the hinged connection 32 shown, the aft platform shows a portion of its second leg 33. The second sidewall 20b spanning between two endwalls 21 has at least two brackets 23 extending outwardly from it. Each bracket has a location near the corners of the second sidewall 20b and the endwalls 21.

The second sidewall proximate the aft platform has a solar panel 35 attached thereto. The solar panel receives sunlight and produces electrical power to charge a lithium ion battery, as later shown in FIG. 10. The battery retains charge during the day so that it may provide electrical power to a heating coil in the sleeping pad as later shown. Preferably, the battery delivers electrical power for up to twelve hours on one charge. Alternatively, the heating coil receives electrical power through a connection to the truck's electrical system. Alternatively, the heating coil receives electrical power from a connection to a separate generator, not shown.

Figure 8:
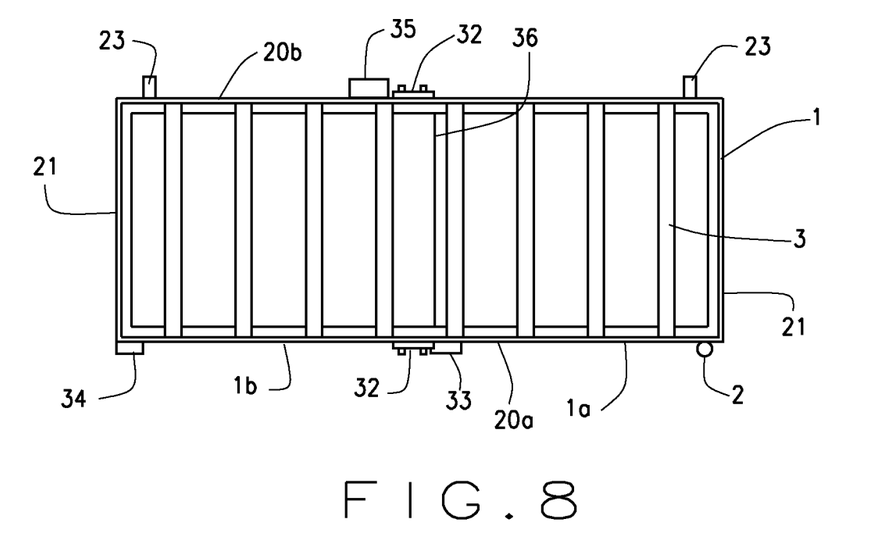
FIG. 8 is a top view of the present invention.

FIG. 8 shows a top view of the platform 1 with the fore platform 1a to the right and the aft platform 1b to the left. The platform has a plurality of slats 3 extending laterally, that is, between the first sidewall 20a and the second sidewall 20b. The first sidewall and the second sidewall have a space apart, mutually parallel position to each other. Two mutually parallel and spaced apart endwalls join the ends of the two sidewalls and form the rectangular shape of the platform. Upon the first sidewall 20a, the fore platform has the leg and one part of the hinge 32 while the aft platform has the second leg 33 and the third leg 34 and the other part of the hinge 32. The hinge allows the aft platform 1b to fold upon the fore platform 1a. Proximate the hinge portions, the platform has a strap 36 that generally spans between the two sidewalls. In this view, the strap appears parallel to the slats however, the flexible nature of the strap appears in the next figure. Then upon the second sidewall 20b, the fore platform has at least one bracket 23 near an endwall 21 and one part of the hinge 32 while the aft platform has the other part of the hinge 32, the solar panel 35, and at least one bracket 23 also near the other endwall 21.

Figure 9:
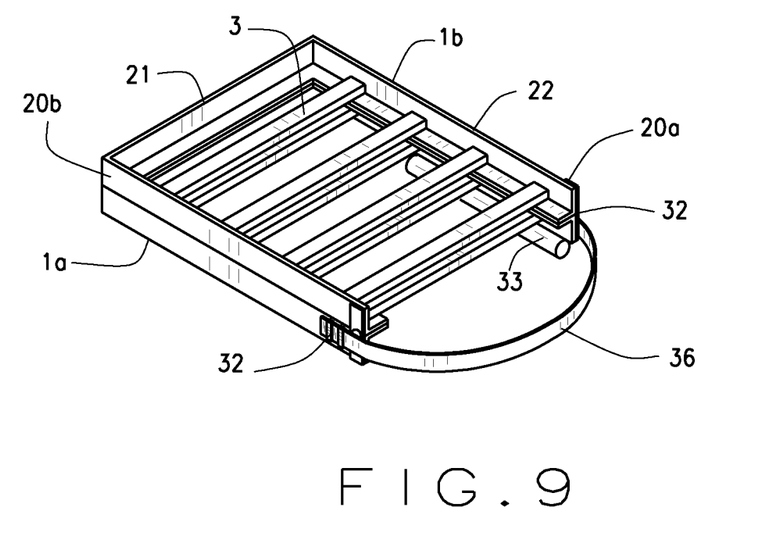
FIG. 9 is a perspective view of the present invention when folded.

The platform also folds for stowage and movement by a user as shown in FIG. 9. The hinge connection 32 upon both sidewalls allows the aft platform 1b to fold upon the fore platform 1a as shown. The aft platform becomes mutually contiguous to the fore platform, that is, the aft platform is on top of the fore platform. Upon folding, the strap 36 may attain an arcuate shape as shown. The strap has a generally flexible construction, such as webbing, and a width, generally similar to the height of sidewall, that provides for user comfort. In this folded position as shown, the aft platform and the fore platform have similar length and the two endwalls 21 abut flush as shown towards the left. Also, the two sidewalls 20a, 20b, fold using the hinges 32 and attain a mutually flush position. The hinge connection and the strap may have various connectors that extend outwardly from the sidewall of the fore platform. This folded position also shows the second leg 33 folded inwardly to the fore platform. With the aft platform folded upon the fore platform, a user places the strap 36 upon his shoulder and then carries the platform as needed.

Figure 10:
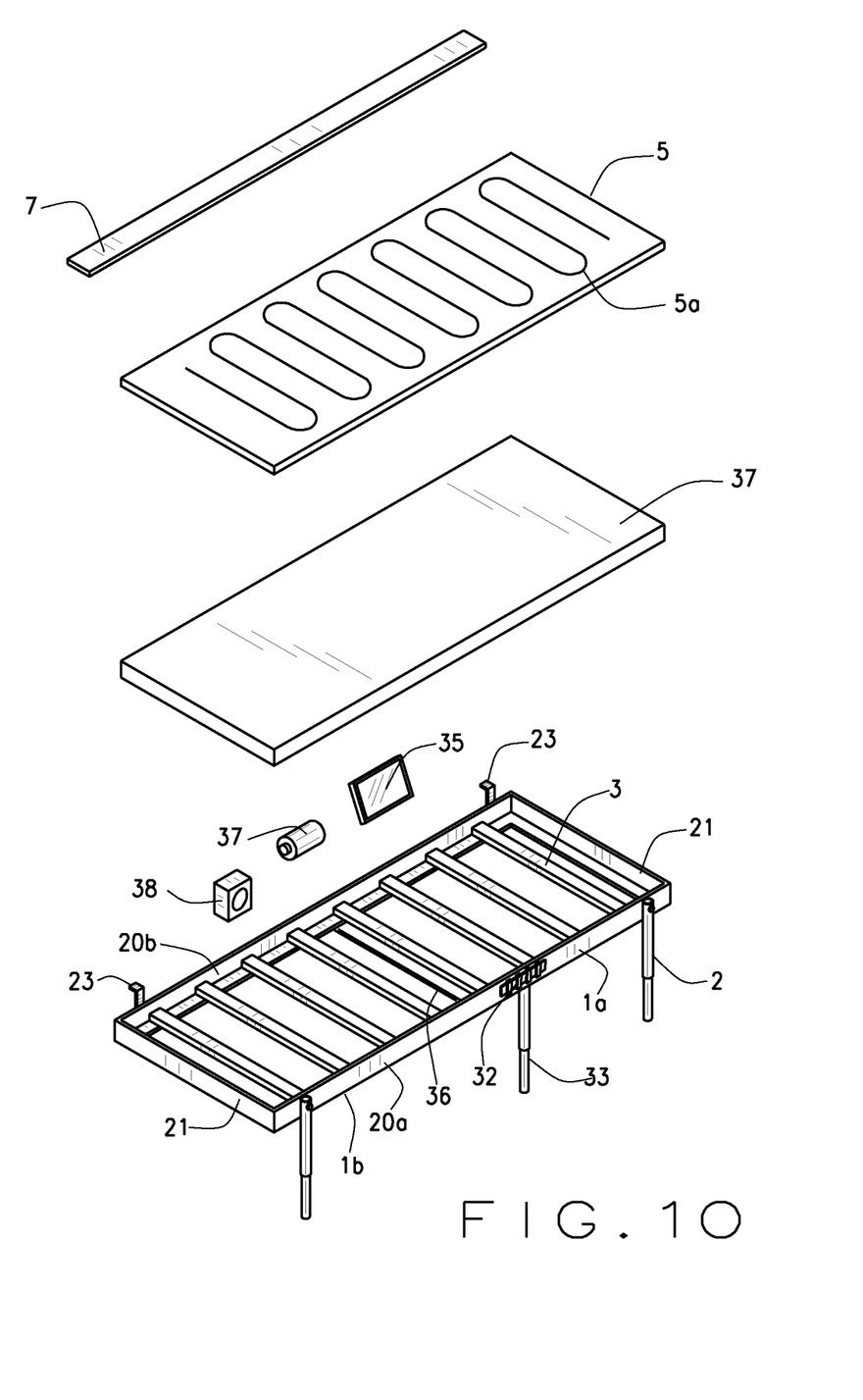
FIG. 10 is an exploded view of the present invention.

And, FIG. 10 shows an exploded view of the present invention with its platform 1 supporting components for the comfort and better sleep of a user. As described above, the platform rests upon a plank 7 that abuts a rail, not shown, of the bed of a truck. The plank has its elongated shape of thin cross section. A user then places himself upon the pad 5 of cushioning material with an outer covering. The pad includes a heating wire, heating coil, or heating element, as shown at 5a that provides a gentle warming to the pad. The pad then rests upon a support plate 37 of semi-rigid material, such as polymer, laminated cardboard, or thin plywood, and having a planar form with a thickness. The support plate spans between the slats and prevents the sleeping pad from deflecting between the slats and the slats from pressing into a sleeping user.

The heating wire 5a has electrical communication to a control 38, such as a rheostat, that a user may turn or rotate to regulate the amount of heat delivered to the sleeping pad. The control also has an override that disables it in the event of a short or overheating situation. The control 38 has electrical communication to the battery as at 37. The battery also has electrical communication to the panel 35 for receiving electrical power from the panel. The battery also has select ports for connecting into a vehicle electrical system, a separate generator, a stand alone battery, or other alternate electrical power source. Preferably the ports are female. Alternatively, the ports are male. The gender of the ports reflects the cooperating connector on cables from an external power source.

As before, the platform 1 has a generally rectangular shape formed of the two endwalls 21 and the two sidewalls 20. The slats 3 span between the sidewalls with a generally parallel orientation to the endwalls. The first sidewall 20a, here in the foreground, has the leg 2, second leg 33, and the third leg 34 shown as descending a distance much greater than the height of the first sidewall. The legs, as before, adjust under the action of a user. The first sidewall also has its hinge 32 just to the right of the second leg in this view. Opposite the first sidewall, the second sidewall 20b has at least two spaced apart brackets 23 of their generally C like shape that rest upon the plank 7 and extend slightly above the second sidewall. The second sidewall has its hinge 32 opposite that of the first sidewall. Between the two hinges, the platform has its strap 36 for carrying or moving the invention when folded by a user. The strap generally separates the fore platform to the right and the aft platform to the left and the two platforms fold upon each other as previously shown in FIG. 9.

From the aforementioned description, a truck bed cot device has been described. The truck bed cot device is uniquely capable of connecting to a wall of a truck bed and attaining a flat orientation for sleeping by a user. Further, the truck bed cot may also have heat delivered to its sleeping pad. The truck bed cot device and its various components may be manufactured from many materials, including but not limited to, vinyl, polymers, such as nylon, polypropylene, polyvinyl chloride, high density polyethylene, polypropylene, ferrous and non-ferrous metals, their alloys, foils, and composites.

Various aspects of the illustrative embodiments have been described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations have been set forth in order to provide a thorough understanding of the illustrative embodiments. However, it will be apparent to one skilled in the art that the present invention may be practiced without the specific details. In other instances, well known features are omitted or simplified in order not to obscure the illustrative embodiments.

Various operations have been described as multiple discrete operations, in a manner that is most helpful in understanding the present invention, however, the order of description should not be construed as to imply that these operations are necessarily order dependent. In particular, these operations need not be performed in the order of presentation.

Moreover, in the specification and the following claims, the terms "first," "second," "third" and the like —when they appear—are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to ascertain the nature of the technical disclosure. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A truck bed cot device, comprising: a platform having a fore platform and an aft platform, said platform having a folded position wherein said fore platform is mutually contiguous to said aft platform and said platform having an unfolded position wherein said fore platform is coplanar with said aft platform; said platform having two mutually parallel and spaced apart sidewalls including a first sidewall and a second sidewall, two mutually parallel and spaced apart endwalls, said endwalls being perpendicular to said sidewalls and of lesser length than said sidewalls, a plurality of slats spanning between said first sidewall and said second sidewall, said slats being generally parallel to said endwalls; each of said sidewalls having a hinge portion connecting said fore platform to said aft platform; said first sidewall having three legs, said three legs having a folded position within said platform and said three legs having an unfolded position generally perpendicular and beneath said platform; said second sidewall having two spaced apart brackets, said brackets located proximate said endwalls; each of said sidewalls having one of an L shape or a C shape cross section; each of said brackets having a cross sectional shape compatible with said sidewalls and formed from a cooperating upper section and a lower section, said upper section having an extension and a flange and said lower section having an extension and a flange; said lower section having a mount extending perpendicular to said extension wherein said flange of said upper section being mutually parallel and spaced apart from said flange of said lower section and said flange of said upper section and said flange of said lower section being perpendicular to said extensions of said upper and lower sections respectively, wherein said upper section and said lower section of each of said brackets is adapted to grasp a rail of a side of a bed of a truck; said mount of each of said brackets supporting said second sidewall below a top surface of the side of the truck when said platform is in said unfolded position; and said upper and lower sections are adjustably joined together to enable adjustment of a distance between the flange of the upper section and the flange of the lower section, wherein changing the distance between the flange of the upper section and the flange of the lower section of the brackets causes a change in elevation of the sidewalls relative to the side of the bed of the truck to which the platform is attached thus providing headroom for a user.

2. The truck bed cot of claim 1 further comprising: a sleeping pad generally upon said platform; each of said mounts connecting at least beneath said second sidewall; each of said sidewalls having at least one sidewall flange generally parallel to a plane defined by said platform in the unfolded position and said extension generally perpendicular to said at least one sidewall flange, said at least one flange located opposite said sleeping pad and beneath said plurality of slats; and, said hinge portions connecting to said sidewalls and each of said hinge portions having an axis of rotation proximate said at least one sidewall flange, wherein said sidewalls open above said hinge portions proximate said sleeping pad and thus said sidewalk remain closed during usage of said platform for sleeping by a user.

3. The truck bed cot of claim 2 wherein each of said slats has a generally square cross section and each of said slats joins to said at least one sidewall flange of both of said sidewalls.

4. The truck bed cot of claim 2 further comprising:
a support plate positioned between said sleeping pad and said platform when in said unfolded position, said support plate having a generally planar form with a thickness, said support plate is adapted to provide firmness to said sleeping pad and prevent said sleeping pad slipping between two of said plurality of slats.

5. The truck bed cot of claim 1 further comprising:
each of said legs having two sections capable of axially adjusting a height of each of said legs and a pivotal connection to said first sidewall; and,
said legs including a first leg, a second leg, and a third leg, said first leg rotating into said fore platform for said folded position, and said second leg and said third leg mutually rotating into said aft platform for said folded position.

6. A method for temporary sleeping accommodation in a truck bed, said truck bed having a rail upon a side of the bed, said method comprising: providing a cot device, said cot device having a fore platform and an aft platform combining to form a platform, said platform having a folded position wherein said fore platform is mutually contiguous to said aft platform and said platform having an unfolded position wherein said fore platform is coplanar with said aft said platform having two mutually parallel and spaced apart sidewalls including a first sidewall and a second sidewall, each of said sidewalls having a shaped cross section, two mutually parallel and spaced apart endwalls, said endwalls being perpendicular to said sidewalls and of lesser length than said sidewalls, each of said endwalls having a shaped cross section, a plurality of slats spanning between said first sidewall and said second sidewall, said plurality of slats being generally parallel to said endwalls, each of said sidewalls having a hinge portion connecting said fore platform to said aft said first sidewall having three legs, said three legs having a folded position within said platform and said three legs having an unfolded position generally perpendicular and beneath said platform, said second sidewall having two spaced apart brackets, said brackets located proximate said endwalls, a sleeping pad generally upon said platform, each of said brackets having a generally C like shape formed from a cooperating upper section and a lower section, said upper section having an extension and a flange and said lower section having an extension and a flange, said lower section having a mount extending perpendicular to said extension and said mount of each of said brackets supports said sidewall below a top surface of the side of the truck when said platform is in said unfolded position, wherein said flange of said upper section being mutually parallel and spaced apart from said flange of said lower section and said flange of said upper section and said flange of said lower section being perpendicular to said extensions of said upper and lower sections respectively, and said upper and lower sections adjustably joined together to enable adjustment of a distance between the flange of the upper section and the flange of the lower section, wherein changing the distance between the flange of the upper section and the flange of the lower section of the brackets causes a chance in elevation of the sidewalls relative to the side of the bed of the truck to which the platform is attached thus providing headroom for a user, one of a heating wire, a heating coil, and a heating element within said sleeping pad, a control connecting in electrical communication to said one of a heating wire, a heating coil, and a heating element, a battery in electrical communication with said control, a solar panel having electrical communication with said battery thus delivering electrical current to said battery and wherein said control is adapted to permit a user to control the temperature of said sleeping pad;

abutting said upper section upon the rail of the side of a bed of a truck and closing said lower section of each of said brackets towards said upper section thus grasping the rail; and, unfolding said legs downwardly wherein said legs have a generally perpendicular orientation to the floor of the bed of the truck to which the platform is attached.

7. The method for temporary sleeping accommodation in a truck bed of claim 6 further comprising: said providing a cot device including each of said mounts connecting beneath said second sidewall each of said sidewalk having a one of an L shape or a C shape cross section, each of said sidewalls having at least one sidewall flange generally parallel to a plane defined by said platform in the unfolded position and said extensions generally perpendicular to said at least one sidewall flange, said at least one sidewall flange located opposite said sleeping pad and beneath said plurality of slats, each of said hinge portions connecting to said sidewalls and having an axis of rotation proximate said at least one sidewall flange, wherein said sidewalls open above said hinge portions proximate said sleeping pad and thus said sidewalls remain closed during usage of said platform by a sleeping user; and, each of said slats having a generally square cross section and each of said slats resting upon said at least one sidewall flange of both of said sidewalls.

8. The method for temporary sleeping accommodation in a truck bed claim 7 further comprising:

said providing a cot device including a support plate positioned between said sleeping pad and said platform when in said unfolded position, said support plate having a generally planar form with a thickness, said support plate is adapted to provide firmness to said sleeping pad and prevent said sleeping pad slipping between two of said plurality of slats.

9. The method for temporary sleeping accommodation in a truck bed of claim 6 further comprising:

said providing a cot device including each of said legs having two sections capable of axial adjustment and a pivotal connection to said first sidewall, and, said legs including a first leg, a second leg, and a third leg, said first leg and said second leg mutually rotating into said fore platform for said folded position, and said third leg rotating into said aft platform for said folded position.

10. A device to support a sleeping person in the bed of a pickup truck, said device comprising: a fore platform and an aft platform combining to form a platform, said platform having a folded position wherein said fore platform is mutually contiguous to said aft platform and said platform having an unfolded position wherein said fore platform is coplanar with said aft platform; said platform having two mutually parallel and spaced apart sidewalls including a first sidewall and a second sidewall, each of said sidewalls having a shaped cross section, two mutually parallel and spaced apart endwalls, said endwalls being perpendicular to said sidewalls and of lesser length than said sidewalls, each of said endwalls having a shaped cross section, a plurality of slats spanning between said first sidewall and said second sidewall, said slats being generally parallel to said endwalls; each of said sidewalls having a hinge portion connecting said fore platform to said aft platform; said first sidewall having three legs, said three legs having a folded position within said platform and an unfolded position generally perpendicular and beneath said platform, each of said legs having two sections capable of axial adjustment and a pivotal connection to said first sidewall, said legs including a first leg, a second leg, and a third leg, said first led and said second led mutually rotating into said fore platform for said folded position, and said third leg rotating into said aft platform for said folded position; said second sidewall having two spaced apart brackets, said brackets located proximate said endwalls, each of said brackets having a generally C like shape formed from a cooperating upper section and a lower section, said upper section having an extension and a flange and said lower section having an extension and a flange, said lower section having a mount extending perpendicular to said extension of said lower section wherein said flange of said upper section being mutually parallel and spaced apart from said flange of said lower section and said flange of said upper section and said flange of said lower section being perpendicular to said extensions of said upper and lower sections respectively, wherein said upper section and said lower section of each of said brackets is adapted to grasp a rail of a side of a bed of a truck and, said mount of each of said brackets supporting said second sidewall below a to surface of the side of the truck when said platform is in said unfolded position; and said upper and lower sections are adjustably joined together to enable adjustment of a distance between the flange of the upper section and the flange of the lower section, wherein changing the distance between the flange of the upper section and the flange of the lower section of the brackets causes a change in elevation of the sidewalls relative to the side of the bed of the truck to which the platform is attached thus providing headroom for a user each of said mounts connecting beneath said second sidewall; each of said sidewalls having at least one sidewall flange generally parallel to a plane defined by said platform when in the unfolded position and said extensions generally perpendicular to said at least one sidewall flange, said at least one flange located opposite said sleeping pad and beneath said plurality of slats; each of said hinge portions connecting to said sidewalls and having an axis of rotation proximate said at least one sidewall flange, wherein said sidewalls open above said hinge portions proximate said sleeping pad and thus said sidewalls remain closed during usage of said platform for sleeping by a user; each of said slats having a generally square cross section and each of said slats resting upon said at least one sidewall flange of both of said sidewalls; and a sleeping pad generally upon said platform.

* * * * *